(12) United States Patent
Uhrenholt

(10) Patent No.: US 12,272,105 B2
(45) Date of Patent: Apr. 8, 2025

(54) ENCODING ARRAYS OF DATA ELEMENTS IN DATA PROCESSING SYSTEMS

(71) Applicant: Arm Limited, Cambridge (GB)

(72) Inventor: Olof Henrik Uhrenholt, Lund (SE)

(73) Assignee: Arm Limited, Cambridge (GB)

( * ) Notice: Subject to any disclaimer, the term of this patent is extended or adjusted under 35 U.S.C. 154(b) by 202 days.

(21) Appl. No.: 18/067,271

(22) Filed: Dec. 16, 2022

(65) Prior Publication Data
US 2023/0196624 A1 Jun. 22, 2023

(30) Foreign Application Priority Data
Dec. 21, 2021 (GB) .................................... 2118628

(51) Int. Cl.
*G06T 1/60* (2006.01)
*G06T 1/20* (2006.01)
*G06T 9/00* (2006.01)

(52) U.S. Cl.
CPC .................. *G06T 9/00* (2013.01); *G06T 1/20* (2013.01); *G06T 1/60* (2013.01)

(58) Field of Classification Search
CPC .... G06T 1/60; G06T 9/00; G06T 1/20; H04N 19/426; H04N 19/00; H03M 7/30; H03M 7/60

See application file for complete search history.

(56) References Cited

U.S. PATENT DOCUMENTS

| | | | |
|---|---|---|---|
| 2007/0097130 A1* | 5/2007 | Margulis | G06F 3/1462 345/501 |
| 2015/0070372 A1 | 3/2015 | Fries et al. | |
| 2019/0034334 A1 | 1/2019 | Arelakis et al. | |
| 2021/0011646 A1 | 1/2021 | Nystad et al. | |

FOREIGN PATENT DOCUMENTS

GB 2575030 1/2020

OTHER PUBLICATIONS

Combined Search and Examination Report dated Jun. 20, 2022, GB Patent Application No. 2118628.3.

* cited by examiner

*Primary Examiner* — Jeffery A Brier
(74) *Attorney, Agent, or Firm* — Pearl Cohen Zedek Latzer Baratz LLP

(57) ABSTRACT

A data processing system comprises a processor that generates data elements of an array of data and stores the data elements in the one or more local buffers. When a set of data elements that corresponds to less than an entire region of plural separate regions that the array of data is divided into is to be written from the one or more local buffers to memory, the processor may encode the set of data elements so as to produce an encoded block of data and store the encoded block of data in memory by: writing body data to one of a first body buffer and a second body buffer, wherein the set of data elements is encoded using a first encoding for which header information descriptive of the body data will be independent of the values of the data elements being encoded.

20 Claims, 8 Drawing Sheets

ENCODING ARRAYS OF DATA ELEMENTS IN DATA PROCESSING SYSTEMS

CROSS-REFERENCE TO RELATED APPLICATIONS

This application claims priority pursuant to 35 U.S.C. 119(a) to GB Application No. 2118628.3, filed Dec. 21, 2021, which application is incorporated herein by reference in its entirety.

BACKGROUND

The technology described herein relates to data processing systems and in particular to techniques for encoding data in data processing systems.

It is common in data processing systems to encode an array of data elements, such as an array of image data values (e.g., frames of video data or graphics data for display), e.g., so as to compress the data in order to reduce bandwidth and memory consumption. This is particularly desirable in data processing apparatus, e.g., of portable devices, where processing resources and power may be limited.

In order to encode an array of data elements, the array of data elements is often divided into smaller blocks (regions) of data elements and encoded on a block by block basis.

The Applicants believe that there remains scope for improvements to techniques for encoding arrays of data elements.

BRIEF DESCRIPTION OF THE DRAWINGS

Various embodiments of the technology described herein will now be described by way of example only and with reference to the accompanying drawings, in which.

Like reference numerals are used for like elements throughout the figures, where appropriate.

DETAILED DESCRIPTION

Figure 1:
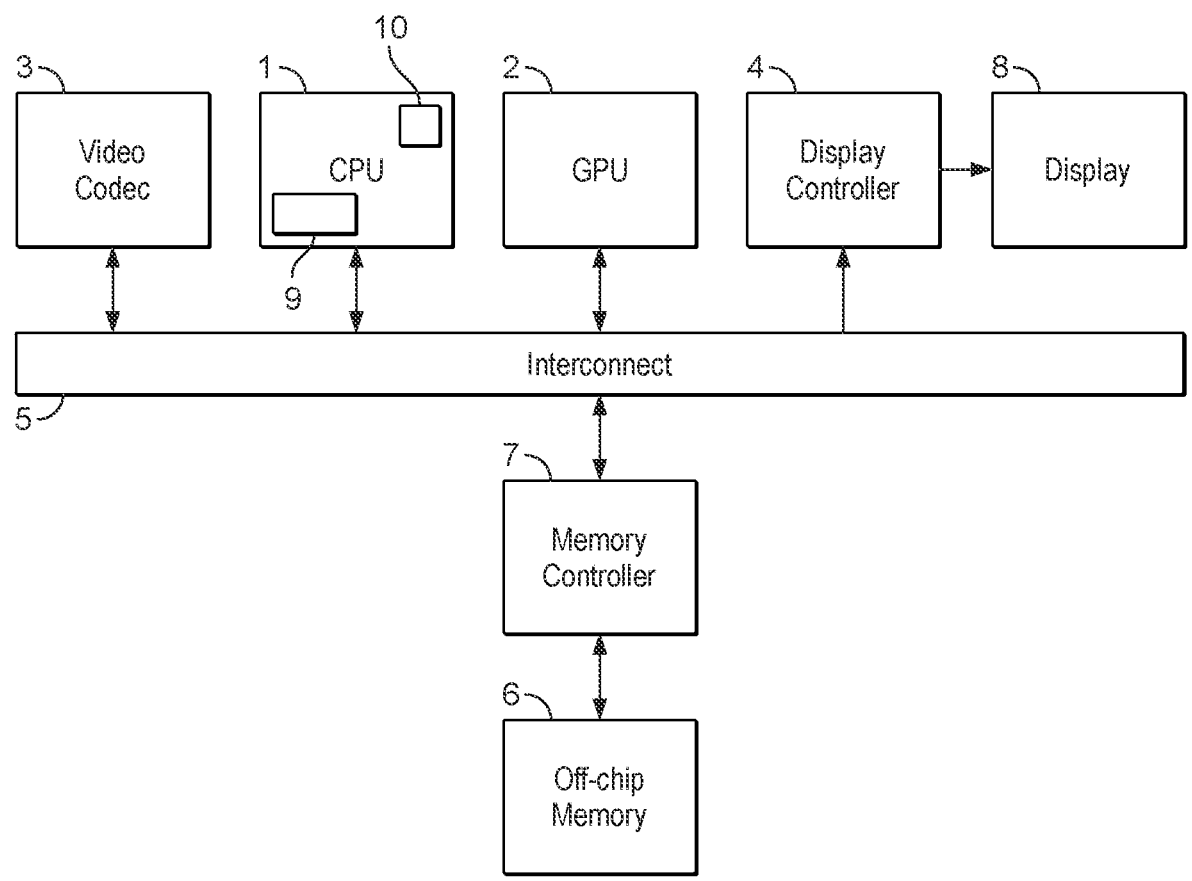
FIG. 1 shows schematically a graphics processing system that may be operated in accordance with embodiments of the technology described herein.

A first embodiment of the technology described herein comprises a method of operating a data processing system that comprises a processor operable to generate arrays of data, wherein the processor comprises one or more local buffers configured to store data generated by the processor locally to the processor prior to that data being written out from the processor to memory;

the method comprising:
the processor generating data elements of an array of data and storing the data elements in the one or more local buffers; and
when a set of data elements of the array of data is to be written from the one or more local buffers to memory:
determining whether the set of data elements corresponds to less than an entire region of plural separate regions that the array of data is divided into; and
when it is determined that the set of data elements corresponds to less than an entire region of the plural separate regions that the array of data is divided into:
encoding the set of data elements so as to produce an encoded block of data and storing the encoded block of data in memory by: writing body data to one of a first body buffer and a second body buffer in memory, wherein the set of data elements is encoded using an encoding for which header information descriptive of the body data will be independent of the values of the data elements being encoded.

A second embodiment of the technology described herein comprises a data processing system that comprises:
a processor comprising one or more local buffers configured to store data locally to the processor, wherein the processor is configured to generate data elements of an array of data and to store the data elements in the one or more local buffers; and
a processing circuit configured to:
when a set of data elements of an array of data generated by the processor is to be written from the one or more local buffers to memory:
determine whether the set of data elements corresponds to less than an entire region of plural separate regions that the array of data is divided into; and
when it is determined that the set of data elements corresponds to less than an entire region of the plural separate regions that the array of data is divided into:
encode the set of data elements so as to produce an encoded block of data and store the encoded block of data in memory by: writing body data to one of a first body buffer and a second body buffer in memory, wherein the set of data elements is encoded using an encoding for which header information descriptive of the body data will be independent of the values of the data elements being encoded.

Embodiments relate to a method of operating a data processing system in which an array of data (e.g., frame) is generated by a (first) processor (e.g., graphics processor) and is stored in a memory (e.g., in a frame buffer in the memory) in an encoded form.

The array of data should be, and in an embodiment is, stored in the memory on a block by block (region by region) basis. A pair of body buffers and a header buffer are in an embodiment provided in the memory in respect of each region of plural regions that the array divided into. Each header buffer in an embodiment stores a header that comprises: (i) a pointer configured to point to (the currently active) one of the first body buffer and the second body buffer, and (ii) header information descriptive of data stored in the one of the body buffers to which the pointer is currently pointing.

The processor has one or more local buffers (e.g., a tile buffer) configured to store data elements of the array of data locally to the processor (prior to that data being written out from the processor to memory).

When a set of data elements of the array of data is to be written from the one or more local buffers to (the) memory, it is determined (by the processing circuit) whether the set of data elements corresponds to less than an entire region (e.g., tile) of the plural regions (e.g., tiles) that the array of data is divided into.

When it is not determined that the set of data elements corresponds to less than an entire region (when it is determined (by the processing circuit) that the set of data elements corresponds to an entire region of the plural separate regions that the array of data is divided into), the set of data elements is in an embodiment encoded so as to produce an encoded block of data, and the encoded block of data is in an embodiment stored in the memory. This is in an embodiment done by (the processing circuit) writing body data in respect of the encoded block of data to (in an embodiment the inactive) one of first and second body buffers (i.e., in an embodiment to the one of the first and second body buffers to which the pointer is not currently pointing), and then writing a header in respect of the encoded block of data to an associated header buffer (in the memory), where the header comprises: (i) a pointer that points to the one of the first body buffer and the second body buffer to which the body data was written, and (ii) header information descriptive of the body data.

In embodiments, a second processor (such as a display controller) of the data processing system is configured to read (and decode) the array of data stored in the memory, and to then use the (decoded) array, e.g., by causing the array (e.g., frame) to be displayed on a display. The data processing system may be configured such that the first processor (e.g., graphics processor) and the second processor (e.g., display controller) can access the memory independently from one another (i.e., such that writes to the memory from the first processor and reads from the memory by the second processor are not (entirely) synchronised).

In embodiments, the data processing system is configured such that when the second processor comes to read data in respect of a particular region of the array of data stored in the memory, it is directed by the pointer to one of the pair of body buffers, i.e., to the active one of the pair. In the meantime, the first processor can continue to generate (new) data in respect of that region, and can store (via the processing circuit) the data in the other (inactive) one of the pair of body buffers. This has the effect of increasing the rate and flexibility with which the array (e.g., frame) can be updated, e.g., since the first processor can write data to the memory (via the processing circuit) substantially at the same time as, and independently of, the second processor reading data from the memory.

In this regard, configuring the first processor to update the header's pointer only after the body data has been written to a body buffer ensures that the second processor will only ever access body buffer data that the first processor has finished writing, i.e., this avoids the risk of the second processor attempting to read incompletely written body data.

Furthermore, in embodiments, the second processor is configured to use the header information when decoding the data. Configuring the first processor to update the header's header information after the body data has been written to the body buffer ensures that the second processor will have the appropriate information it needs to properly decode the body data.

Thus, it will be appreciated that the use of a pair of body buffers which share the same header in the manner of various embodiments (in many circumstances) has the effect of ensuring that only valid body data can be obtained by the second processor.

However, the Applicant has furthermore recognised that this arrangement relies on the assumption that each body buffer will only ever be written to once before the other body buffer of the pair is written to, i.e., the body buffers of each pair will be written to one after the other. Although this is often the case (in particular where the set of data elements being written from the local buffer (e.g., tile buffer) to the memory corresponds to an entire region), the Applicant has also now recognised that in some circumstances, it can be necessary or desirable to write body data to the same body buffer multiple times, i.e., to perform multiple writes to one of the body buffers, before writing to the other body buffer of the pair.

As will be described in more detail below, this can occur, in particular, where it is necessary to write a set of data elements from the local buffer(s) to the memory that corresponds to less than an entire region (e.g., tile). In this case, it may be necessary to combine the (new) set of data elements with existing data for that region (e.g., in respect of parts of the region that are not covered by the new set of data elements) e.g., that is already stored in the body buffer in question.

In these circumstances, it could happen that a secondary write to a body buffer uses a different encoding (layout) to an initial write to that body buffer. This would then necessitate a change in the header information, i.e., to ensure that the second processor can properly decode the new data. However, should the second processor attempt to read the body data before the header has been updated, it could attempt to decode the new body data using the old, potentially incompatible, header information. This could lead to the second processor (e.g., display controller) producing invalid data (and potentially causing that data to be displayed).

In the technology described herein, in order to avoid this possibility, when data is to be written from a local buffer to the memory, sets of data elements that correspond to less than an entire region are treated differently to sets of data elements that correspond to an entire region.

In particular, when it is determined that a set of data elements to be written from a local buffer to the memory corresponds to less than an entire region (e.g., tile), the set of data elements is encoded so as to produce an encoded block of data, and the encoded block of data is stored in the memory by writing body data to one of the first body buffer and the second body buffer (in an embodiment as before). However, in this case, the set of data elements is (in an embodiment always) encoded using an encoding for which the associated header information is independent of the particular values of the data elements being encoded. In other words, the set of data elements is encoded using an encoding for which the header information is invariant when different sets of data elements are encoded. For example, and in particular embodiments, where the header information comprises information indicative of a layout of body data stored in the body buffer to which the pointer is currently pointing, the set of data elements may be encoded using an encoding for which the associated layout is invariant when different sets of data elements are encoded.

In this regard, the Applicant has furthermore recognised that a fully uncompressed encoding mode, e.g., of the Arm Frame Buffer Compression (AFBC) block-based compression scheme, has this property. Thus, in particular embodiments, when a set of data elements that is to be written from the local buffer to the memory is determined to correspond to less than an entire region (e.g., tile), the set of data elements is (in an embodiment always) encoded using an uncompressed mode.

This then means that, in circumstances (as described above) where it is necessary to perform a secondary write to a particular body buffer, there will be no need to update the associated header information, as the old header information (that was written after an earlier write to that body buffer) will be valid for decoding the new data. Thus, in these circumstances, the second processor will be able to properly decode the new body data using the old header information. This in turn means that the possibility of the second processor obtaining invalid data is avoided.

It will accordingly be appreciated that embodiments provide an improved method of operating a data processing system.

In embodiments of the technology described herein, the memory can comprise any suitable memory of the data processing system, and may be configured in any suitable and desired manner. In embodiments, it is a main memory of the data processing system. In embodiments, it is a memory that is off chip from the processor, i.e., an external (main) memory (external to the processor).

Similarly, the processor may comprise any suitable processor that is operable to generate arrays of data, such as for example, a graphics processing unit (GPU), a video processor/codec or video engine (video processing unit (VPU)), a digital camera image signal processor (ISP), an image processor, and/or a central processing unit (CPU), etc. There may be more than one processor operable to generate the array or arrays of data, if desired. In particular embodiments, the processor is a graphics processor or a video processor.

Similarly, the processing circuit can be any suitable circuit (or circuits) of the data processing system. The processing circuit may (at least in part) be part of the processor. Thus, in these embodiments, the processor comprises (at least part of) the processing circuit.

In other embodiments, the processing circuit is separate to, e.g., may be a separate circuit (e.g., integrated circuit) to, the processor.

In embodiments, the processing circuit comprises a determining circuit operable to determine whether a set of data elements to be written out corresponds to less than an entire region (e.g., tile) (and to cause appropriate data write out on the basis of the determination), an encoding circuit operable to produce encoded blocks of data, and a storing circuit operable to store encoded blocks of data produced by the encoding circuit in the memory. The determining circuit and/or the encoding circuit and/or the storing circuit may comprise separate circuits, or may be at least partially formed of shared processing circuits.

The determining circuit may comprise any suitable circuit. The determining circuit may be separate to, e.g., may be a separate circuit (e.g., integrated circuit) to the processor, or may be part of the processor. Thus, in embodiments, the processor comprises the determining circuit, and the processor both generates the set of data elements, and determines a manner in which to write out the set of data elements (based on whether or not the set of data elements corresponds to less than an entire region).

The processor should generate its array in an appropriate manner, e.g., by rendering the array in the case of a graphics processor, by appropriately decoding input encoded video data in the case of a video processor, from a captured image in the case of a digital camera image signal processor (ISP), etc.

The array of data elements that is generated by the processor can be any suitable data array. It should comprise a plurality of data elements (entries), each occupying different positions in the array. The data array may be an image (may represent an image). In various embodiments the data array is a frame of (image) (e.g., colour) data, e.g., for display, or a graphics texture. It would also be possible for the array of data elements to comprise an array of other graphics data, such as an array of depth data.

In an embodiment, the array of data elements is a frame that is generated for display for an application, such as a game, and in an embodiment for an augmented reality or virtual reality application. Each array of data elements (frame) accordingly in an embodiment comprises an image to be displayed.

Each data element has a value. The data array element data values can take any suitable and desired form, and will depend upon the nature of the data array, e.g., whether it is a texture, an image, a frame, etc. In the case of a texture, for example, the data array element data values should be texture data (texel values). Such texture data could comprise, e.g., a set of colour values (Red, Green, Blue (RGB), a set of colour and transparency values (Red, Green, Blue, Alpha (RGBa)), a set of luminance and chrominance values, a set of shadow (light) map values, a set of a normal map (bump map) values, z values (depth values), stencil values, luminance values (luminance textures), luminance alpha textures, and/or gloss maps, etc.

In the case of an image or frame for display, the data array element data values should be pixel and/or sampling position data (data values). Such pixel data could comprise, e.g., appropriate colour (RGB) values, or luminance and chrominance values, etc.

The processor has one or more local buffers that is or are configured to store data of the array (generated by the processor) locally to (on-chip with) the processor (prior to that data being written out from the processor to the memory). The one local buffer or each local buffer can comprise any suitable local buffer that is operable to store data generated by the processor.

In embodiments, where the processor is a (tile-based) graphics processor, the or a local buffer of the one or more local buffers is a tile buffer, e.g., arranged at the end of a graphics processing pipeline that the graphics processor is configured to execute. In these embodiments, each array generated by the processor may be divided into a plurality of smaller tiles (regions), where each tile (region) is generated by the processor separately (typically one after another) (and where the tiles (regions) can be recombined to provide the complete array). The tile buffer in an embodiment has a size and configuration sufficient to store data in respect of a single tile (region) of the plural tiles (regions) that the overall array is divided into.

Thus, the method may comprise the graphics processor generating data elements of a tile of an array of graphics data and storing the data elements of the tile in the tile buffer.

A local buffer of the one or more local buffers may also or instead comprise a buffer (cache) of a cache system. For example, the processor may include a cache system comprising a cache operable to cache data stored in the memory for the processor, e.g., where the processor is operable to receive data from the memory by reading from the cache, and send data to the memory by writing to the cache. In embodiments, the or a local buffer is a lowest level cache (i.e., a cache of the cache system which is closest to the processor, i.e., an L1 cache) of the cache system.

In the technology described herein, the processor is configured to generate data elements of its array of data, and store the generated data elements in the one or more local buffers. The data is subsequently written from the one or more local buffers to the memory. This is done by (the processing circuit) firstly encoding the data, and then storing the encoded data in the memory.

Thus, when data is to be written from the one or more local buffers to the memory, the data is in an embodiment provided (sent) to the encoding circuit (of the processing circuit) for encoding. The encoding circuit may comprise any suitable such circuit that is operable to encode sets of data elements to as to produce an encoded version of the set of data elements, and may encode sets of data elements in any suitable manner.

The encoding circuit may (and in various embodiments does) form part of the processor, e.g., may be (integrated) encoding circuit of a graphics processing unit (GPU), a video processor/codec or video engine (video processing unit (VPU)), a digital camera image signal processor (ISP), an image processor, and/or a central processing unit (CPU), etc. Thus, in these embodiments, the processor both generates the set of data elements, and encodes the set (using its encoding circuit).

In various other embodiments, the encoding circuit may be separate to, e.g., may be a separate circuit (e.g., integrated circuit) to the processor, e.g., may comprise a "standalone" encoding unit, e.g., that is configured to receive (and encode) sets of data elements from the processor. Where the system includes a cache system, the encoding circuit may be associated with or form part of the cache system.

The encoding circuit may be configured to encode sets of data elements using any suitable encoding scheme. In embodiments, the encoding scheme is a block-based encoding scheme. Thus, the encoding circuit is in an embodiment configured to encode (and the method comprises encoding) sets of data elements on a block-by-block basis. The (each) array of data elements produced by the processor may be, in effect, divided into plural separate blocks or regions, and an encoded block of data may be generated in respect of each different block or region that the array of data elements is divided into.

The blocks (regions) that the data array is divided into for encoding purposes can take any suitable and desired form. Each block should comprise a sub-set of the data elements (positions) in the array, i.e., correspond to a particular region of the array. In an embodiment the array is divided into non-overlapping and regularly sized and shaped blocks. The blocks are in an embodiment square, but other arrangements could be used if desired.

The blocks may correspond to a block size that will otherwise be used in the data processing system in question. Thus, for example, in the case of a tile based graphics processing system, the blocks may correspond to (have the same size and configuration as) the tiles (regions) that the (rendering process of the) graphics processor operates on. In these embodiments, the method may comprise the graphics processor generating data elements of a tile of an array of graphics data, storing the data elements of the tile in the tile buffer, and then (the processing circuit) subsequently writing the data elements from the tile buffer to the memory by encoding the data elements and storing the encoded data in the memory.

In an embodiment, the data array is divided into 16×16 blocks (i.e., blocks of 16×16 array positions (entries)). In one such arrangement, a single encoded block is generated for each 16×16 block. Thus, in the case of a texture map, for example, a separate encoded block would be generated for each (non-overlapping) 16×16 texel region of the texture map, and in the case of an image or a frame, an encoded block would be generated for each 16×16 pixel or sampling position region of the image or frame.

Other arrangements would, of course, be possible. For example, instead of generating a single encoded block for a 16×16 block, four encoded blocks, each representing an 8×8 or a 16×4 block within the 16×16 block could be generated (in effect therefore, the data array would be divided into 8×8 or 16×4 blocks).

The encoding scheme that is used to encode blocks of the data array can be any suitable block-based encoding scheme. The encoding scheme may encode the data in a lossless manner such that the original array of data elements can be perfectly reconstructed from the encoded data. For example, Arm Frame Buffer Compression (AFBC) may be used. Thus, the encoding circuit may be operable to encode arrays of data in the manner described in U.S. Patent Application No. 2013/0034309 (the contents of which are incorporated herein by reference). It would also be possible to use other encoding schemes.

Thus, in various embodiments, the data array is divided into plural separate regions, and a respective encoded block is generated for each different region that the data array is divided into. That is, plural encoded blocks are generated, one encoded block for each region that the array of data elements is divided into.

Once encoded, each encoded block of data is stored in the (main) memory, in an embodiment by the storing circuit of the processing circuit.

The storing circuit may comprise any suitable such circuit that is operable to store encoded blocks of data in the memory. The storing circuit may be separate to, e.g., may be a separate circuit (e.g., integrated circuit) to the processor, or may be part of the processor. Where the system includes a cache system, the storing circuit may be part of the cache system. For example, a local buffer of the processor may be a lower level (e.g., L1) cache of the cache system, and the storing circuit may comprise a higher level (e.g., L2) cache of the cache system (that is closer to the memory).

In embodiments, the memory is configured such that, for each region (e.g., tile) of the plural separate regions (e.g., tiles) that each array of data is divided into, a respective first body buffer, second body buffer and header buffer are provided in the memory for storing data in respect of that region (e.g., tile). Each encoded block of data may comprise body data (i.e., payload data) and a header. When an encoded block (generated for a particular region that the data array is divided into) is to be stored in the memory, the body data of that encoded block may be stored in one of the body buffers (i.e., one of the first and second body buffers) provided in memory for that particular region, and the header of that encoded block may be stored in the header buffer provided in memory for that particular region.

Each header in an embodiment comprises (i) a pointer configured to point to one of the first body buffer and the second body buffer, and (ii) header information descriptive of the body data stored in the one of the first body buffer and the second body buffer to which the pointer is pointing. Thus, the memory may include a header buffer that stores a header for each region that the data array has been divided into, with each header including a pointer pointing to body data for the respective region. The pointer may be configured to point to the one of the first and second body buffers which stores the most current (i.e., the active) body data in respect of the region in question.

The header information is in an embodiment descriptive of the body data stored in the one of the first body buffer and the second body buffer to which the pointer is pointing. The header information may describe any suitable property of the body data. In particular embodiments, the header information is descriptive of one or more properties of an encoding used to encode the body data. For example, (the processing circuit of the) data processing system may be configured to encode each set (block) of data elements using one encoding from a plurality of possible different encodings, and the header information may be descriptive of the particular encoding used to produce the body data. The plurality of possible different encodings may include, for example, one or more different compressed modes (i.e., where the body data is stored in the body buffer in a compressed form) and an uncompressed mode (i.e., where the body data is stored in the body buffer in an uncompressed form).

In particular embodiments, the (processing circuit of the) data processing system is configured to store body data in a body buffer using one data layout from a plurality of possible different layouts, and the header information is descriptive of the particular layout used to store the body data. The plurality of different possible layouts may include, for example, one or more different compressed layouts (i.e., where the body data is stored in a body buffer in a compressed form) and an uncompressed layout (i.e., where the body data is stored in a body buffer in an uncompressed form). Thus, the header information may be descriptive of a layout of the body data stored in the body buffer to which the pointer is currently pointing.

Where an encoded block of data was previously generated for a particular region and stored in the memory, body data should, and in an embodiment will, (already) be stored in one of the body buffers (i.e., one of the first and second body buffers) provided in memory for that particular region, and the corresponding header should, and in an embodiment will, be pointing to that body buffer. In this case, in some embodiments, when a (new) encoded block (generated for the particular region) is to be stored in the memory, the body data of the new encoded block is written to the one of the body buffers (i.e., the one of the first and second body buffers) to which the pointer is not currently pointing, i.e., to the inactive one of the pair of body buffers.

After this has been done, the (new) header of the new encoded block may be written to the header buffer provided in memory for that particular region. The new header should, and in an embodiment will, comprise (i) a pointer that points to the one of the first body buffer and the second body buffer to which the new body data was written, and (ii) header information descriptive of the new body data.

This process may be repeated in respect of each new encoded block of data generated for each particular region that the array is divided into. Thus, the body buffer of the pair of body buffers to which new body data is written may be swapped from one encoded block to the next (and the header may be updated for each new encoded block to reflect this). Swapping the body buffers in this manner has the effect of increasing the rate and flexibility with which the array regions can be updated.

Once stored in the memory, each encoded block may subsequently be read and decoded (e.g., by a second processor). Thus, the method may further comprise a second processor reading one or more encoded blocks from the memory, and then decoding the encoded block(s). The second processor may read (and decode) only one block, multiple blocks or the entire array from the memory. To do this, the second processor may comprise a decoding circuit operable to decode encoded blocks of data.

In particular embodiments, the data processing system is configured such that when the second processor comes to read (and decode) an encoded block of data in respect of a particular region of the array of data, it firstly reads the header stored in the header buffer for that region. As described above, the header should, and in an embodiment will, include (i) a pointer that points to one of the first body buffer and the second body buffer, and (ii) header information descriptive of the body data stored in the one of the first body buffer and the second body buffer to which the pointer is pointing.

The second processor may be configured to use the pointer to determine from which one of the pair of body buffers it should obtain body data. That is, the second processor may be directed by the pointer stored in the memory for a particular region to one of the pair of body buffers, i.e., to the active one of the pair. The second processor may then obtain the body data stored in the one of the body buffers to which the pointer is pointing, e.g., by reading (only) the body data stored in the one of the body buffers to which the pointer is pointing. Alternatively, the second processor may read all of the body data (in both body buffers), but may discard any data stored in the body buffer to which the pointer does not point.

The second processor may then use the header information when decoding the body data (obtained from the body buffer to which the pointer is pointing). For example, where the header information is descriptive of an encoding (e.g., layout) used to produce the body data (as described above), the second processor may use this information to apply an appropriate decoding to the body data, i.e., in order to obtain validly decoded data. Once decoded, the data may be used by the second processor in any suitable manner.

The second processor may comprise any suitable processor that is operable to use arrays of data elements, and may use such data arrays in any suitable manner. The nature of the second processor will depend upon the nature of the data array being used.

Thus, for example, where the array of data elements comprises a frame or image for display (e.g., generated by a graphics processing unit (GPU), a video processor, a digital camera image signal processor (ISP), an image processor, and/or a central processing unit (CPU), etc.), then the second processor may comprise, for example, a display controller or a display processor operable to provide the (decoded version of the) array of data elements to a display for display. As such, the second processor may use the decoded version of the array of data by providing the decoded version of the array of data elements (e.g., frame or image) to a display for display (i.e., displaying the decoded version of the array of data elements (e.g., frame or image)).

Where the array of data elements comprises a texture (e.g., generated by a graphics processing unit (GPU)), then the second processor may comprise, for example, a graphics processing unit (GPU). In this case, the consumer graphics processing unit (GPU) may be the same as the producer graphics processing unit (GPU) (i.e., a graphics processing unit (GPU) may generate and then subsequently use the texture), or the consumer graphics processing unit (GPU) may be a different graphics processing unit (GPU) to the producer graphics processing unit (GPU). As such, the decoded version of the array of data elements may be used by using the decoded version of the array of data elements (e.g., texture) during a (subsequent) rendering operation. In this case, the array (e.g., texture) may be used in the (subsequent) rendering operation in any suitable manner, according to any suitable graphics processing technique (that requires the use of a texture).

In embodiments, the second processor comprises a display processor operable to provide arrays (e.g., frames or images) to a display for display.

The display processor can comprise any suitable and desired display processor that is operable to provide data arrays (e.g., frames or images) (e.g., generated by the processor) to a display for display. The display processor is in an embodiment operable to read (encoded) data of arrays from memory, decode the encoded arrays (as described above), optionally perform appropriate "display processing" on those arrays, and then provide the optionally processed arrays to the display for display.

In these embodiments, the data processing system may also comprise a display operable to display data arrays (e.g., images or frames for display). The display will operate to display the received data array (frame or image) (e.g., and in an embodiment, in the normal manner of operation for the display in question). Thus, the data elements (pixels) for the data array will be appropriately scanned onto the panel of the display, to display the data array.

Thus, in embodiments, the second processor (e.g., display controller) of the data processing system is configured to read (and decode) the array of data stored in the memory, and to then use the (decoded) array, e.g., by causing the array (e.g., frame) to be displayed on a display.

The data processing system may be configured such that the first processor (e.g., graphics processor) and the second processor (e.g., display controller) can access the memory independently from one another, i.e., such that writes to the memory from the first processor and reads from the memory by the second processor are not (entirely) synchronised.

As described above, the data processing system may be configured such that when the second processor reads data in respect of a particular region (i.e., when it reads a particular block of the array of data) stored in the memory, it is directed by the pointer to one of the pair of body buffers, i.e., to the active one of the pair. In the meantime, the first processor can continue to generate (new) data in respect of that region, and can store (via the processing circuit) the data in the other (inactive) one of the pair of body buffers. This has the effect of increasing the rate and flexibility with which the array (e.g., frame) can be updated, e.g., since the first processor can write data to the memory (via the processing circuit) substantially at the same time as, and independently of, the second processor reading data from the memory.

In this regard, configuring the first processor to update the header's pointer only after the body data has been written to a body buffer ensures that the second processor will only ever access body buffer data that the first processor has finished writing, i.e., this avoids the risk of the second processor attempting to read incompletely written body data.

Furthermore, as described above, the second processor may be configured to use the header information when decoding the body data. In this regard, configuring the first processor to update the header's header information after the body data has been written to the body buffer ensures that the second processor will have the appropriate information it needs to properly decode the body data.

Thus, it will be appreciated that the use of a pair of body buffers which share the same header in the manner of various embodiments (in many circumstances) has the effect of ensuring that only valid body data can be obtained by the second processor.

However, the Applicant has furthermore recognised that this arrangement relies on the assumption that each body buffer will only ever be written to once before the other body buffer of the pair is written to, i.e., the body buffers of each pair will be written to one after the other. Although this is often the case (in particular where the set of data elements being written from the local buffer (e.g., tile buffer) to the memory corresponds to an entire region), the Applicant has also now recognised that in some circumstances, it can be necessary or desirable to write body data to the same body buffer multiple times, i.e., to perform multiple writes to one of the body buffers, before writing to the other body buffer of the pair.

This can occur, in particular, where it is necessary to write a set of data elements from the local buffer(s) to the memory that corresponds to less than an entire region. For example, where the set of data elements is to be combined with existing data for the region in question (e.g., in respect of parts of the region that are not covered by the new set of data elements) that is already stored in the memory, it may be necessary to read the existing data may from a particular body buffer in the memory (and decode that data), to then combine the data with the new set of data elements, and to then write back the data (in an encoded form) to the same particular body buffer.

In these circumstances, it could happen that a secondary write to the particular body buffer uses a different encoding (e.g., layout) to the earlier write to that particular body buffer. This would then necessitate a change in the header information, i.e., to ensure that the second processor can properly decode the new data. However, should the second processor attempt to read the body data before the header has been updated, it could attempt to decode the new body data using the old, potentially incompatible, header information. This could lead to the second processor (e.g., display controller) producing invalid data (and potentially causing that data to be displayed).

In the technology described herein, in order to avoid this possibility, when data is to be written from a local buffer to the memory, sets of data elements that correspond to less than an entire region are treated differently to sets of data elements that correspond to an entire region. As used herein, a set of data elements corresponds to an entire region when the set of data elements completely covers that region (and correspondingly, a set of data elements corresponds to less than an entire region when the set of data elements only partially covers (does not fully cover) that region). Thus, for example, and in an embodiment, where each region corresponds to a tile that the (rendering process of the) graphics processer operates on, a set of data elements should, and in an embodiment will, be determined to correspond to an entire region (by the processing circuit) when the set of data elements completely covers a tile (and correspondingly, a set of data elements should, and in an embodiment will, be determined to correspond to less than an entire region (by the processing circuit) when the set of data elements only partially covers (does not fully cover) a tile).

In the technology described herein, when a set of data elements that corresponds (is determined to correspond) to an entire region of the plural separate regions that the array of data is divided into is to be written from the one or more local buffers to the memory (e.g., when an entire tile of data is to be written from a local buffer (e.g., the tile buffer) to the memory), then the encoding operation in an embodiment proceeds as "normal". That is, the set of data elements is in an embodiment encoded using the block-based encoding scheme, so as to produce an encoded block of data, and the encoded block of data is in an embodiment stored in the memory. As described above, this is in an embodiment done by (the processing circuit) writing body data in respect of the encoded block of data to (the inactive) one of the first and second body buffers (i.e., to the one of the first and second body buffers to which the pointer is not currently pointing), and then updating the associated header by: (i) updating the pointer so that the pointer points to the one of the first body buffer and the second body buffer to which the body data was written (i.e., swapping which of the body buffers the pointer points to), and (ii) updating the header information so that the header information is descriptive of the (new) body data.

In these embodiments, when a set of data elements that corresponds (is determined to correspond) to an entire region is to be written from the local buffer to the memory, the set of data elements can be encoded as desired, e.g., using a compressed mode or an uncompressed mode.

When a set of data elements that corresponds (is determined to correspond) to less than an entire region is to be written from a local buffer to the memory (e.g., when less than an entire tile of data is to be written from a local buffer (e.g., from a buffer of the cache system) to the memory), the set of data elements is encoded so as to produce an encoded block of data, and the encoded block of data is stored in the memory by writing body data to one of the first body buffer and the second body buffer (e.g., as above).

However, in this case, the set of data elements is (in an embodiment always) encoded using an encoding for which the associated header information (i.e., the header information produced from the encoding operation) is independent of the particular values of the data elements being encoded. In other words, the set of data elements is encoded using an encoding for which the header information (of the resulting encoded block of data) is invariant when different sets of data elements are encoded (such an encoding may be referred to herein as a "first encoding" and/or an "invariant encoding"). For example, and in particular embodiments, where the header information comprises information descriptive of a layout of body data stored in the body buffer to which the pointer is currently pointing, the set of data elements may be encoded using an encoding for which the associated layout (and layout information) is invariant when different sets of data elements are encoded.

In this regard, the Applicant has recognised, in particular, that a fully uncompressed encoding mode, e.g., of the Arm Frame Buffer Compression (AFBC) block-based compression scheme, has this property (i.e., is an invariant encoding). Thus, in particular embodiments, when a set of data elements that corresponds (is determined to correspond) to less than an entire region is to be written from the local buffer to the memory, the set of data elements is (in an embodiment always) encoded using an uncompressed mode.

This then means that, in circumstances (as described above) where it is necessary to perform a secondary write to a particular body buffer, there will be no need to update the associated header information, as the old header information (that was written after an earlier write to that body buffer) will be valid for decoding the new data. Thus, in these circumstances, the second processor will be able to properly decode the new body data using the old header information. This in turn means that the possibility of the second processor obtaining invalid data is avoided.

In these embodiments, when a set of data elements that corresponds (is determined to correspond) to less than an entire region (e.g., tile) is to be written from a local buffer to the memory, it may firstly be determined (by the processing circuit) whether or not the set of data elements should be combined with existing data for the region (e.g., tile) in question (e.g., in respect of parts of the region (tile) that are not covered by the new set of data elements), that is already stored in the memory.

In particular embodiments, this determination may be made based on the header information currently stored in the memory in respect of the region (e.g., tile) in question. In particular, where the header information indicates that the body data currently stored in the memory for a region does not use the invariant encoding, then it can be (and in embodiments it is) assumed that the new set of data elements for that region (tile) does not need to be combined with the existing body data stored in the memory (since, the previous memory write in respect of that region (tile) is likely to have been for a set of data elements corresponding to the entire region (tile)). In contrast, where the header information indicates that the body data currently stored in the memory for a region (e.g., tile) does use the invariant encoding, then it can be (and in embodiments it is) assumed that the new set of data elements for that region (tile) should be combined with the existing body data stored in the memory (since, the previous memory write in respect of that region (tile) is likely to have been for a set of data elements corresponding to the less than the entire region (tile)).

Thus, in embodiments, when a set of data elements that corresponds (is determined to correspond) to less than an entire region is to be written from a local buffer to the memory, the processor may read the header information stored in the memory in respect of that region. Where the header information indicates that the body data currently stored in the memory for that region does not use (other than uses) the invariant encoding, then it may be determined that the body data should be written to the one of the body buffers to which the pointer does not currently point (i.e., to the inactive body buffer).

Thus, in this case, the new set of data elements may be encoded so as to produce an encoded block of data (using the invariant encoding) and the encoded block of data may be stored in the memory by: writing body data to the one of the body buffers (i.e., the one of the first and second body buffers) to which the pointer is not currently pointing, i.e., to the inactive one of the pair of body buffers. After this has been done, the (new) header of the new encoded block may be written to the header buffer provided in memory for that region, where the new header comprises (i) a pointer that points to the one of the first body buffer and the second body buffer to which the new body data was written, and (ii) header information descriptive of the new body data.

However, where the header information indicates that the encoded block currently stored in the memory for the region does use the invariant encoding, then it may be determined (by the processing circuit) that the body data should be combined with existing body data for the region, and then written to the one of the body buffers to which the pointer currently points (i.e., to the active body buffer).

Thus, in these embodiments, the processor may read, from the memory, the encoded block of data that was previously generated (and that is currently stored in the memory) for the region, and (a decoding circuit, e.g., of the processor) may decode that encoded block of data. The (first) processor reading and decoding the encoded block of data may be done in a corresponding manner to that described above with respect to the second processor reading and decoding an encoded block of data. Thus, the processor may read the header stored in the header buffer in respect of the region in question. The processor may use the pointer in the header to determine from which one of the pair of body buffers it should obtain body data, and the processor may then obtain the body data stored in the one of the body buffers to which the pointer is pointing. The e.g., decoding circuit may then use the header information when decoding the body data (obtained from the body buffer to which the pointer is pointing).

Once the block has been decoded, the processor may then combine the (new) set of data elements (that is to be written to the memory) with the decoded block of data so as to produce a modified block of data, e.g., by replacing or blending, with the new set of data elements, the data elements of the decoded block of data that appear at the same positions in the array as the new set of data elements. The processing circuit may then encode the modified block of data, and store the encoded modified block of data in the memory.

In these embodiments, the body data of the encoded modified block of data is stored in the same body buffer as the body buffer from which the body data of the encoded block of data was obtained. Thus, the processing circuit may store the encoded modified block of data in the memory by writing body data of the encoded modified block of data to the one of the first body buffer and the second buffer from which the body data of the encoded block of data was obtained.

In these embodiments, as described above, there is no need to update the header, and so in particular embodiments, the header is not (is other than) written.

It will be appreciated from the above that various embodiments provide an improved method of operating a data processing system.

The technology described herein can be implemented in any suitable system, such as a suitably configured microprocessor based system. In an embodiment, the technology described herein is implemented in a computer and/or micro-processor based system. The technology described herein is in an embodiment implemented in a portable device, such as, and in an embodiment, a mobile phone or tablet.

The technology described herein is applicable to any suitable form or configuration of processor and data processing system, such as graphics processors (and systems) having a "pipelined" arrangement (in which case the graphics processor comprises a rendering pipeline). It may be applicable, for example, to tile based graphics processors and graphics processing systems. Thus the processor may be a tile-based graphics processor.

In an embodiment, the various functions of the technology described herein are carried out on a single data processing platform that generates and outputs data, for example for a display device.

As will be appreciated by those skilled in the art, the data (e.g., graphics) processing system may include, e.g., and in an embodiment, a host processor that, e.g., executes applications that require processing by the data (e.g., graphics) processor. The host processor will send appropriate commands and data to the data (e.g., graphics) processor to control it to perform data (e.g., graphics) processing operations and to produce data (e.g., graphics) processing output required by applications executing on the host processor. To facilitate this, the host processor should, and in an embodiment does, also execute a driver for the processor and optionally a compiler or compilers for compiling (e.g., shader) programs to be executed by (e.g., a programmable execution unit of) the processor.

The processor may also comprise, and/or be in communication with, one or more memories and/or memory devices that store the data described herein, and/or store software (e.g., (shader) program) for performing the processes described herein. The processor may also be in communication with a host microprocessor, and/or with a display for displaying images based on data generated by the processor.

The technology described herein can be used for all forms of input and/or output that a data (e.g., graphics) processor may use or generate. For example, the data (e.g., graphics) processor may execute a graphics processing pipeline that generates frames for display, render to texture outputs, etc. The output data values from the processing are in an embodiment exported to external, e.g., main, memory, for storage and use, such as to a frame buffer for a display.

The various functions of the technology described herein can be carried out in any desired and suitable manner. For example, the functions of the technology described herein can be implemented in hardware or software, as desired. Thus, for example, the various functional elements, stages, and "means" of the technology described herein may comprise a suitable processor or processors, controller or controllers, functional units, circuitry, circuit(s), processing logic, microprocessor arrangements, etc., that are operable to perform the various functions, etc., such as appropriately dedicated hardware elements (processing circuit(s)) and/or programmable hardware elements (processing circuit(s)) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuit(s), etc., if desired.

Furthermore, any one or more or all of the processing stages of the technology described herein may be embodied as processing stage circuitry/circuits, e.g., in the form of one or more fixed-function units (hardware) (processing circuitry/circuits), and/or in the form of programmable processing circuitry/circuits that can be programmed to perform the desired operation. Equally, any one or more of the processing stages and processing stage circuitry/circuits of the technology described herein may be provided as a separate circuit element to any one or more of the other processing stages or processing stage circuitry/circuits, and/or any one or more or all of the processing stages and processing stage circuitry/circuits may be at least partially formed of shared processing circuitry/circuits.

Subject to any hardware necessary to carry out the specific functions discussed above, the components of the data processing system can otherwise include any one or more or all of the usual functional units, etc., that such components include.

It will also be appreciated by those skilled in the art that all of the described embodiments of the technology described herein can include, as appropriate, any one or more or all of the optional features described herein.

The methods in accordance with the technology described herein may be implemented at least partially using software e.g., computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a data processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

FIG. 1 shows a graphics processing system in accordance with an embodiment.

The exemplary graphics processing system shown in FIG. 1 comprises a host processor comprising a central processing unit (CPU) 1, a graphics processor (graphics processing unit (GPU)) 2, a video processing unit (VPU) 3, and a display controller 4. As shown in FIG. 1, these processing units can communicate via an interconnect 5 and have access to an off-chip memory system (memory) 6 via the bus 5 and a memory controller 7. Other processing units may be provided.

In use of this system, the CPU 1, and/or VPU 3 and/or GPU 2 will generate frames (images) to be displayed, and the display controller 4 will provide frames to a display 8 for display. To do this the CPU 1, and/or VPU 3 and/or GPU 2 may read in data from the memory 6 via the interconnect 5, process that data, and return data to the memory 6 via the interconnect 5. The display controller 4 may then read in that data from the memory 6 via the interconnect 5 for display on the display 8.

For example, an application 9, such as a game, executing on the host processor (CPU) 1 may require the display of graphics processing unit rendered frames on the display 8. In this case, the application 9 will send appropriate commands and data to a driver 10 for the graphics processing unit 2 that is executing on the CPU 1. The driver 10 will then generate appropriate commands and data to cause the graphics processing unit 2 to render appropriate frames for display and store those frames in appropriate frame buffers in main memory 6. The display controller 4 will then read those frames into a buffer for the display from where they are then read out and displayed on the display panel of the display 8.

As part of this processing, the graphics processor 2 will read in data, such as textures, geometry to be rendered, etc. from the memory 6, process that data, and then return data to the memory 6 (e.g., in the form of processed textures and/or frames to be displayed), which data will then further, e.g., as discussed above, be read from the memory 6, e.g., by the display controller 4, for display on the display 8.

Thus, there will be a need to transfer data between the memory 6 and the graphics processor 2, and also between the memory 6 and the display controller 4. In order to facilitate this, and to reduce the amount of data that needs to be transferred to and from memory, the data may be stored in a compressed form in the memory 6.

As the graphics processor 2 will typically need to operate on the data in an uncompressed form, this accordingly means that data that is stored in the memory 6 in compressed form will need to be decompressed before being processed by the graphics processor 2. Correspondingly, data produced by the graphics processor 2 may need to be compressed before being stored in the memory 6.

Figure 2:
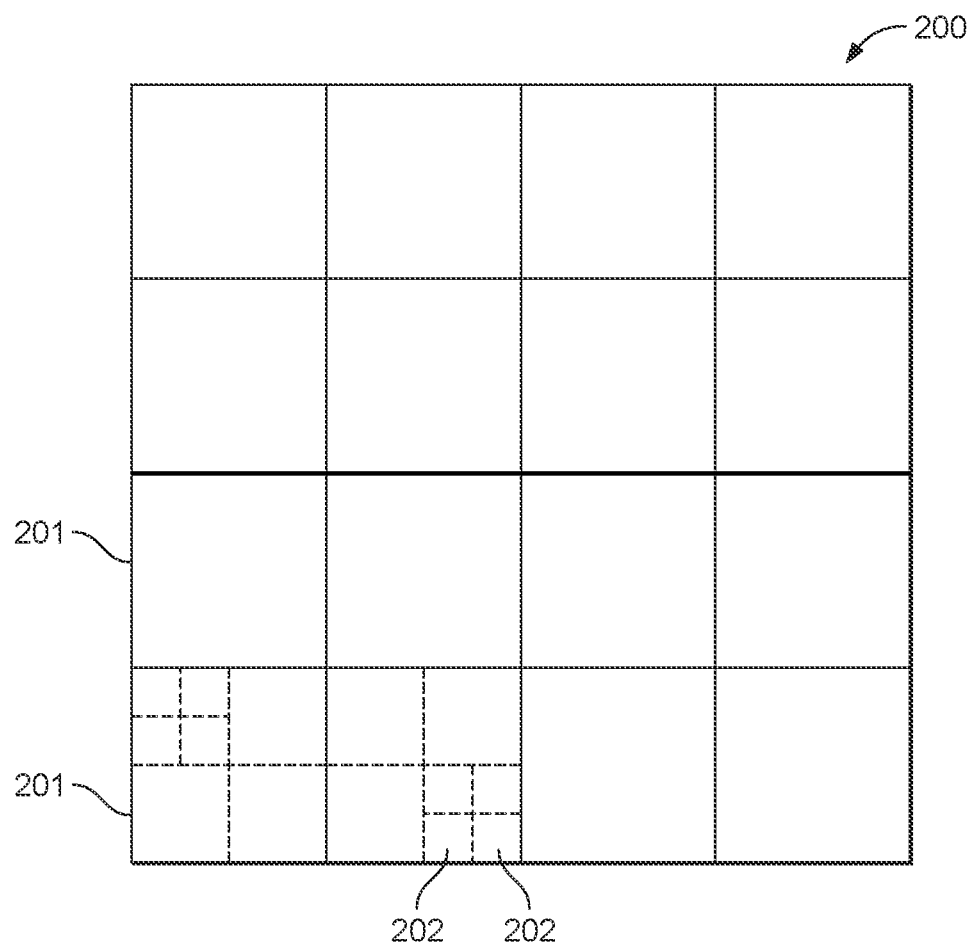
FIG. 2 shows schematically a data array that may be processed in accordance with embodiments of the technology described herein.

FIG. 2 shows schematically an exemplary data array 200 that may be generated and/or used by the graphics processor 2, and stored in the memory 6 in a compressed form, according to embodiments.

The array of data 200 is a two dimensional data array containing a plurality of data elements (i.e., containing data array entries at a plurality of particular positions within the array). The data array 200 could be any suitable and desired array of data, such as data representing an image.

In a graphics processing context, the data array 200 could, for example, be a texture map (i.e., an array of texture elements (texels)), or an array of data representing a frame to be displayed (in which case the data array may be an array of pixels to be displayed). In the case of a texture map, each data entry (position) in the data array will represent an appropriate texel value (e.g., a set of colour values, such as RGBA, or luminance and chrominance, values for the texel). In the case of a frame for display, each data entry (position) in the array will indicate a set of colour values (e.g., RGB values) to be used for displaying the frame on a display.

It will be appreciated, however, that the technology described herein extends to more general "compute" processing (rather than graphics processing per se), such as in accordance with the OpenCL™ or Vulkan® APIs, or other forms of kernel execution. Thus, for example, in other embodiments the data array 200 is generated and/or used in compute processing.

In the present embodiments, the data array 200 is encoded and compressed to provide a set of data representing the data array 200 that is then stored in memory 6, and from which set of data, the data values of individual data elements in the data array 200 can be derived by decoding the data representing the data array 20.

In the present embodiments, as shown in FIG. 2, to encode and compress the data array 200, the data array 200 is first divided into a plurality of non-overlapping, equal size and uniform blocks 201, each block corresponding to a particular region of the data array 200. Each block 201 that the data array 200 is divided into is further sub divided into a set of non-overlapping, uniform and equal size sub blocks 202.

In the present case, each block 201 corresponds to 16×16 elements (positions) within the data array 200 (i.e., a block of 16×16 texels in the case of a texture map), and each block 201 is divided into a set of sixteen sub blocks 202. Each sub block 202 accordingly corresponds to a 4×4 data element region within the block 201 (e.g., 4×4 texels in the texture map). Other arrangements would be possible.

The blocks 201 of the data array 200 are then encoded to provide a compressed representation of the blocks of the data array 200.

The encoding scheme that is used to encode blocks of the data array 200 can be any suitable block-based encoding scheme. The encoding scheme may encode the data in a lossless manner such that the original array of data elements can be perfectly reconstructed from the encoded data. For example, Arm Frame Buffer Compression (AFBC) may be used. In this case, the memory 6 may include a header buffer that stores a header data block for each block 201 that the data array 20 has been divided into, with each header data block including a pointer pointing to compressed sub-block 202 data for the respective block 201. It would also be possible to use other encoding schemes.

Figure 3:
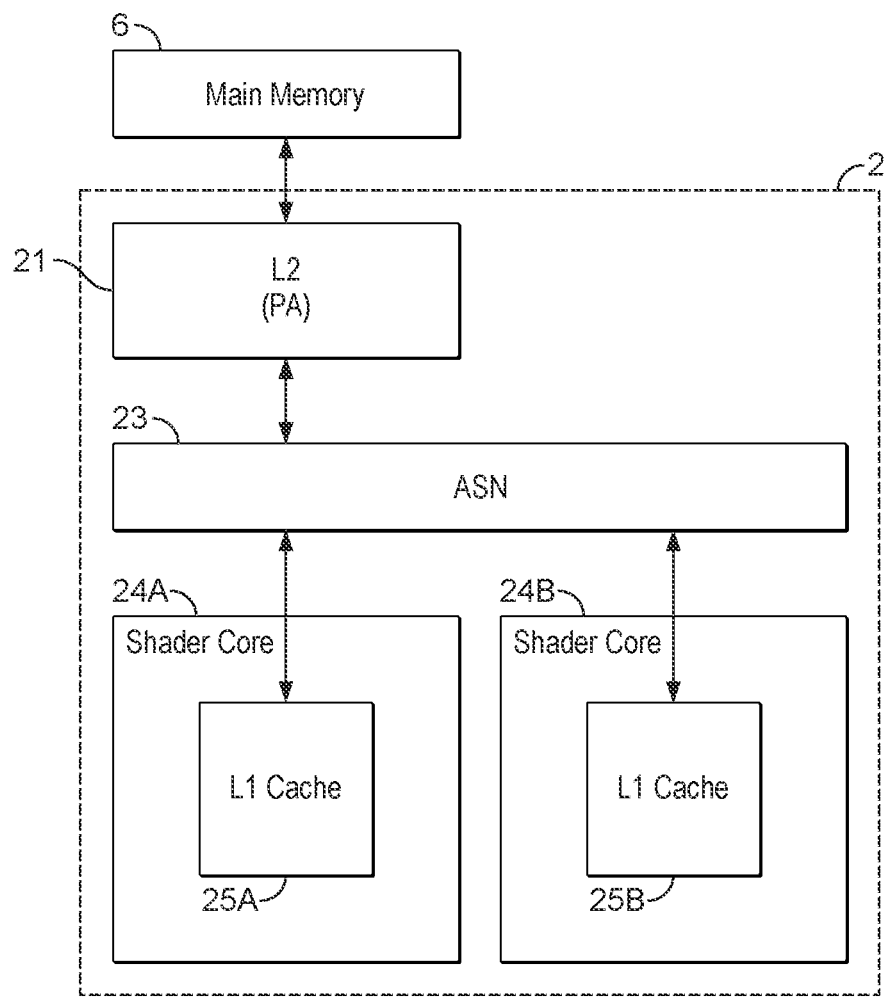
FIG. 3 shows a graphics processor in accordance with embodiments of the technology described herein.
Figure 4:
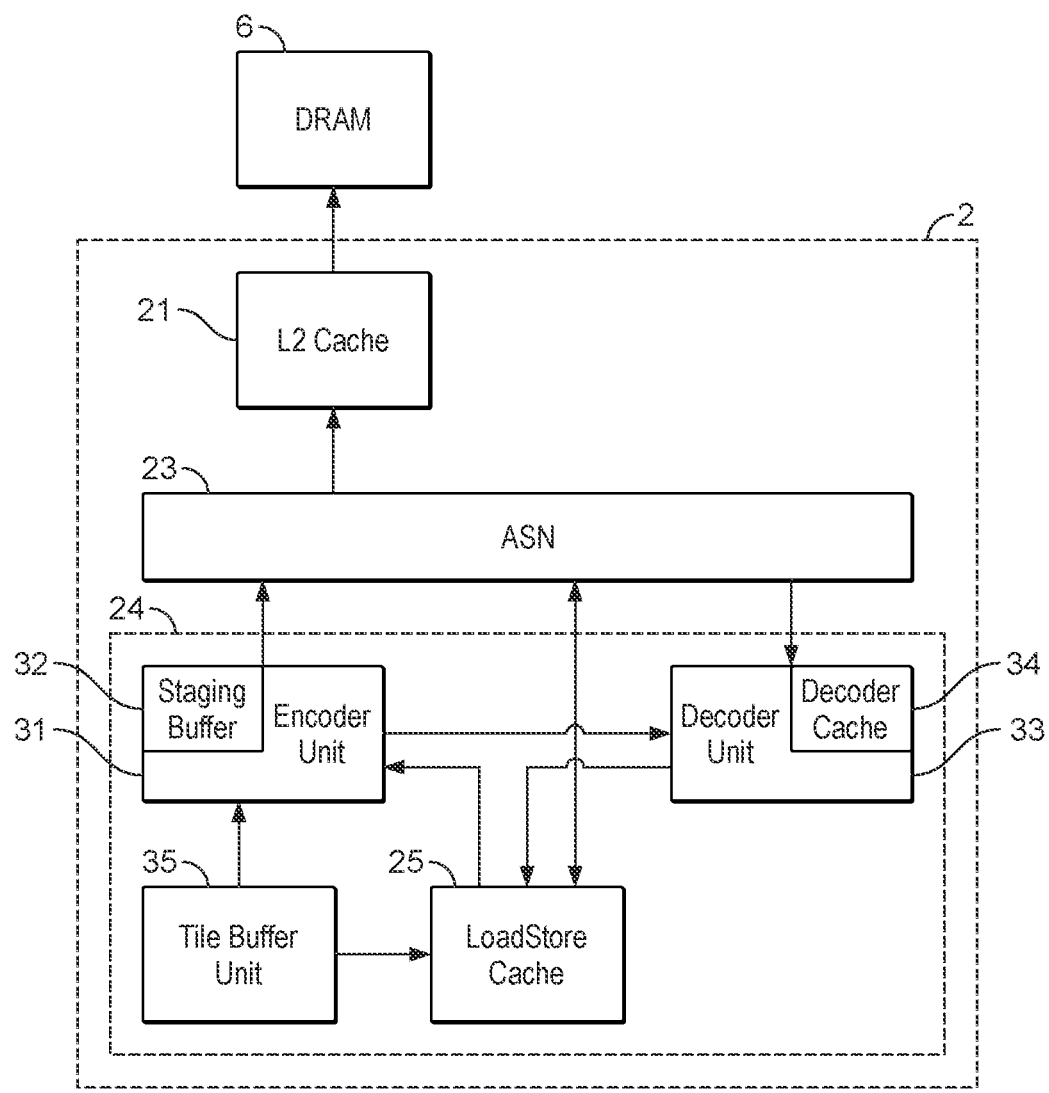
FIG. 4 shows a graphics processor in accordance with embodiments of the technology described herein.

FIGS. 3 and 4 shows schematically in more detail elements of the graphics processor 2 of the system shown in FIG. 1. As will be appreciated by those skilled in the art there may be other elements of the graphics processor 2 that are not shown in FIGS. 3 and 4.

As shown in FIG. 3, the graphics processor 2 of the present embodiment may include plural processing cores (shader cores) 24A, 24B. FIG. 3 shows two shader cores 24A, 24B, but it will be appreciated that other numbers of shader cores (e.g., only one, or three or more) are possible.

As shown in FIG. 3, the graphics processor 2 further includes a cache system that is operable to transfer data from the memory system 6 to the processing cores (shader cores) 24A, 24B of the graphics processor 2, and conversely to transfer data produced by the processing cores 24A, 24B of the graphics processor 2 back to the memory 6.

The cache system shown in FIG. 3 is illustrated as comprising two cache levels: an L2 cache 21 that is closer to the memory 6, and a respective L1 cache 25A, 25B associated with each shader core 24A, 24B of the graphics processor 2 (and from which the data is provided to the respective shader cores 24A, 24B). Other caches and cache levels would be possible. For example, an L3 cache may be provided in between the L2 cache 21 and memory system 6.

As shown in FIG. 3, in this embodiment data is transferred from the memory system 6 to an L1 cache 25A, 25B via the L2 cache 21, and from an L1 cache 25A, 25B to the respective shader core 24A, 24B (and vice-versa).

The graphics processor 2 also includes, as shown in FIG. 3, an appropriate interconnect 23 (in this case in the form of an asynchronous switch network (ASN)) for transferring data between the L2 cache 21 and the L1 caches 25A, 25B (shader cores 24A, 24B).

In the present embodiments, in order to facilitate the use of compressed data, compressed data received from the memory system 6 via the L2 cache 21 is decompressed before being stored in a decompressed form in an L1 cache 25A, 25B for use by the respective shader cores 24A, 24B, and, conversely, data that is to be evicted from an L1 cache 25A, 25B and stored in a compressed form is compressed prior to that data being written to the L2 cache 21. Thus, the cache system implements "cache-based compression". The arrangement in this regard is shown in more detail in FIG. 4.

FIG. 4 illustrates a single shader core 24 of the graphics processor 2 for clarity, but it will be appreciated that each shader core 24A, 24B may be arranged as illustrated in FIG. 4. As shown in FIG. 4, in the present embodiment, each shader core 24 includes a respective encoder 31, decoder 33, and Load/Store (L1) cache 25. As will be appreciated by those skilled in the art there may be other elements of the shader core 24 that are not shown in FIG. 4.

The decoder 33 is operable to decompress compressed data received from the memory system 6 via the L2 cache 21 before providing that data to be stored in decompressed form in the L1 cache 25 for use by the respective shader core 24. As shown in FIG. 4, the decoder 33 includes a decoder cache 34 for the temporary storage of data when performing a decoding operation.

Conversely, the encoder 31 is operable to compress data that is to be evicted from the L1 cache 25 before providing that data to be stored in a compressed form in the L2 cache 21. As shown in FIG. 4, the encoder 31 includes a staging buffer 32 for the temporary storage of data when performing an encoding operation.

In the present embodiment, the GPU 2 is a tile-based GPU. (In tile based rendering, rather than the GPU 2 processing an entire render output, e.g., frame, in one go as in immediate mode rendering, the render output, e.g., frame to be displayed, is divided into a plurality of smaller sub regions, usually referred to as "tiles". Each tile (sub region) is rendered by the GPU 2 separately (typically one after another), and the rendered tiles (sub regions) are then recombined to provide the complete render output, e.g., frame for display. In such arrangements, the render output is typically divided into regularly sized and shaped sub regions (tiles) (which are usually, e.g., squares or rectangles), but this is not essential.)

Thus, in the present embodiment, each shader core 24 includes a respective tile buffer unit 35. The tile buffer 35 is provided as part of RAM that is located on (local to) the graphics processor 2.

When the GPU 2 generates a render output (e.g., frame), the GPU 2 writes output values of the render output to the tile buffer 35, from where they can be output to a frame buffer in the main memory 6 for display (in the manner described above). Once the GPU 2 has processed a tile of the render output and its data has been exported to the main memory 6 for storage, the next tile is then processed, and so on, until sufficient tiles have been processed to generate the entire render output (e.g., frame (image) to be displayed). The display controller 4 can then read the entire render output (e.g., frame) for display. The process is then repeated for the next render output (e.g., frame) and so on.

As shown in FIG. 4, in the present embodiment, the encoder 31 is operable to compress each tile of data that is to be written out to memory 6 by the tile buffer unit 35.

Thus, each tile of data is stored in the memory 6 in a compressed form, e.g., using a block based compression scheme, such as Arm Frame Buffer Compression (AFBC). In the present embodiment, the size and shape of each compression block 201 is configured to correspond to a tile. Thus, once an entire tile has been produced by the GPU 2 and stored in the tile buffer 35 (locally to the GPU 2), the entire tile is (e.g., AFBC) encoded and the encoded tile is written to the frame buffer in the external memory 6.

In graphics processing systems, it is common for the frame buffer in main memory 6 to use a so-called "double buffer" (or triple buffer) arrangement. In these arrangements, while the GPU 2 is writing tiles of a render output (e.g., frame) to a first buffer (i.e., a "back buffer") in the main memory 6, the display controller 4 can read a previous version of the render output (e.g., a previous frame) from a second buffer (i.e., a "front buffer") in the main memory 6 (where the GPU 2 previously stored the previous version of the render output).

Once the GPU 2 has written an entire render output (e.g., an entire frame) to the back buffer (and once the display controller 4 has finished reading the previous version of the render output), the back buffer and front buffer are in effect swapped, e.g., so that the GPU 2 can then write tiles of a new render output to the second buffer (which is now the back buffer), and the display controller 4 can read the render output from the first buffer (which is now the front buffer).

These arrangements have the effect of increasing the rate at which frames can be displayed, e.g., since the GPU 2 can write a frame to the memory 6 at the same time as the display controller 4 is reading a frame from the memory 6.

However, a disadvantage with these arrangements is that additional latency is introduced into the graphics processing system. This is because the GPU 2 has to render an entire render output (e.g., a complete frame) before the display controller 4 can begin reading it.

This additional latency can be acceptable in some circumstances, but may not be acceptable in others. For example, in virtual reality (VR), augmented reality (AR), etc. applications, latency can be particularly undesirable, e.g., where an input, such as the movement of a user's head, affects the GPU's 2 output.

In these (and other) circumstances, instead of the GPU 2 exclusively writing its tiles to the back buffer, so-called "front buffer rendering" may be used, i.e., where the GPU 2 may write one or more tiles directly to the front buffer.

It should be noted here that, although various particular embodiments are related to front buffer rendering in a double buffered memory arrangement, embodiments also apply to a singly buffered memory arrangement (e.g., in which case all tiles are effectively written to a front buffer).

Front buffer rendering naturally and unavoidably produces some (acceptable) visual artefacts, e.g., since a displayed frame can include a mixture of tiles from the current and the previous frame.

However, a more significant problem with conventional front buffer rendering is that it can also produce so-called "tearing" visual artefacts, which can be particularly noticeable and therefore undesirable. These artefacts can occur when the display controller 4 reads a tile that has only been partially written to the memory 6 by the GPU 2.

In the present embodiment, such "tearing" visual artefacts are avoided by configuring the block based compression scheme (e.g., AFBC) to prevent the situation where the display controller 4 can read a tile that has only been partially written to the memory 6 by the GPU 2.

As described above, each encoded block 201 includes a header and one or more blocks of body data, where the header describes the body data and is used when decoding the body data. In the present embodiment, each encoded superblock 201 is provided with two body buffers (i.e., at different locations in the memory 6), which share the same header. The compression scheme is then configured such that the header points to the currently valid body buffer of the two body buffers, and describes the body data of that body buffer.

Figure 5A:
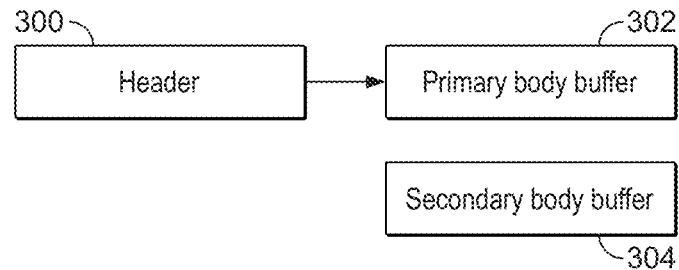
FIG. 5A shows schematically a data layout that may be used in accordance with embodiments of the technology described herein.

This is illustrated by FIG. 5A. As shown in FIG. 5A, each encoded superblock 201 has a header 300, and two body buffers, namely a primary body buffer 302 and a secondary body buffer 304. The header 300 points to the body buffer that is currently valid (which, in the example shown in FIG. 5A, is the primary body buffer 302).

When a new encoded superblock 201 is being written to the memory 6, the body data is written to the old body buffer first (e.g., to the secondary body buffer 304), and then the header 300 is updated so as to point to the written to body buffer (e.g., the secondary body buffer 304). The header 300 must be written after the body data, and the header 300 will re-assign which body buffer is being used.

When the display controller 4 comes to read an encoded superblock 201, it will read the header 300 first. The display controller 4 is then directed by the header 300 to the valid body data in the valid body buffer. The display controller 4 will also obtain appropriate information from the header 300 to be able to decode that body data appropriately.

This arrangement means that body data can be written to the memory 6 in such a way that the display controller 4 will only ever be able to access valid body data.

Figure 5B:
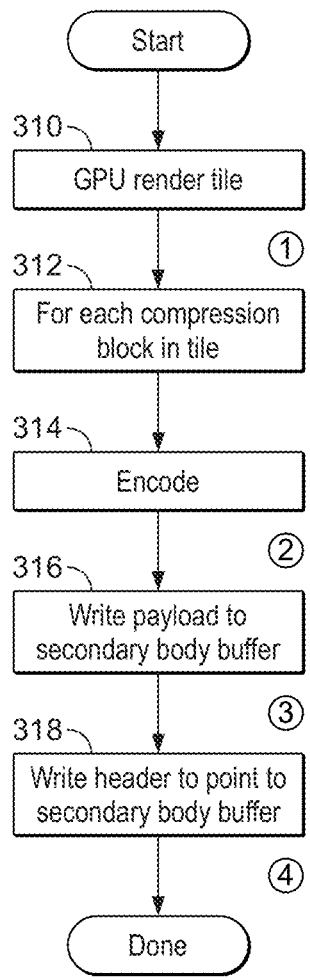
FIG. 5B shows schematically a graphics processing operation in accordance with embodiments of the technology described herein.

This is illustrated by FIG. 5B. As shown in FIG. 5B, the GPU 2 firstly renders a new tile (step 310). At this point, the GPU 2 is rendering but has not yet written anything to memory 6. If the display processor 4 reads the header 300, it will see the primary body buffer 302 in memory 6. The display processor 4 will therefore obtain valid data from the previous frame.

Next, each compression block in the tile is encoded (steps 312 and 314). At this point, the GPU 2 is still rendering and still has not written anything to the memory 6. If the display processor 4 reads the header 300, it will see the primary body buffer 302 in memory 6. The display processor 4 will therefore obtain valid data from the previous frame.

Next, the GPU 2 writes payload data for the compression block to the secondary body buffer 304 (step 316). At this point, the GPU 2 has written payload to the secondary body buffer 304, but has not yet updated the header 300. If the display processor 4 reads the header 300, it will see the primary body buffer 302 in memory 6. The display processor 4 will therefore obtain valid data from the previous frame.

Finally, the GPU 2 updates the header 300, so that it points to the secondary body buffer 304 (step 318). At this point, the GPU 2 has updated which body buffer is referenced by the header. If the display processor 4 reads the header 300, it will see the secondary body buffer 304 in memory 6. The display processor 4 will therefore obtain valid data from the current frame.

Thus, embodiments use two body buffers in order to reduce access latency between the GPU 2 and the display processor 4. A single header 300 is used to address the two body buffers 302, 304. When the display processor 4 reads the header 300 it will be directed to a valid one of the two body buffers 302, 304.

The Applicant has furthermore recognised that, although in many circumstances this approach will mean that the display processor 4 will always access valid data, in some circumstance this may not be the case.

In particular, if the GPU 2 writes one entire compressed superblock 201 out at a time to the memory 6 from the tile buffer 35 (where the tile buffer 35 has a size equal to the size of an (e.g., AFBC) encoded superblock 201), and then updates the shared header 300, the header 300 is guaranteed to always be valid, so that the display controller 4 will always obtain valid data.

However, in some circumstances, it can happen that only part of a tile (part of a superblock 201) is written out to the memory 6.

In particular, the Applicant has recognised that this can occur when the GPU 2 uses a cache based compression scheme (as described above). In this case, it can be necessary to write only part of a tile (and so part of a superblock 201) to the memory 6, e.g., when one or more cache lines are evicted from the load store cache 25.

As described above, the load/store cache 25 stores uncompressed data. Thus, data evicted from the load/store cache 25 is uncompressed, but data in the frame buffer in memory 6 is compressed.

This means that, when it is necessary to evict less than an entire tile of data from the load/store cache 25 (such as one or more cache lines), the graphics processing system must perform a sequence of steps including: reading in and decoding the previous version of the particular block 201 from memory 6, modifying the decoded block with the evicted cache line, re-encoding the modified block, and then writing the re-encoded block back to memory 6. Thus, an encoding operation can be dynamically triggered.

If this were to happen only once, the arrangement described above with respect to FIG. 5 would be sufficient to ensure that the display processor 4 could only ever access valid data. In this case, the header 300 could be updated after the modified encoded superblock is written to the secondary body buffer 304. The display controller 4 would then be properly directed by the header 300 to the valid body buffer, in the manner described above.

However, when using a cache based compression scheme, it can happen that different cache lines of the same tile are evicted from the load/store cache 25 at different times. For example, once one cache line has been evicted from the load/store cache 25 (and stored in the memory 6 in the manner described above), if another cache line is subsequently evicted from the load/store cache 25, the previously modified encoded superblock will need to be overwritten again (in the manner described above) and its header 300 then updated.

In these circumstances, it is necessary to write to the secondary body buffer 304 again (as memory space for each new body buffer is typically allocated when a tile is to be written back, i.e., all writes during a single "tile writeback" operation are constrained to write to the same physical memory). However, if the display controller 4 were to read the header 300 while the secondary modified encoded superblock is being written (before the header 300 has been updated), it would try to decode the new data using the old header, and so could produce corrupt decoded data.

It will accordingly be appreciated that the Applicant has recognised that the process described above with respect to FIG. 5 relies on the fact that the GPU 2 will write a new header 300 for each superblock 201 exactly once. However, with dynamically triggered encodes in a cache-based compression flow (CBC), this becomes more complex. Dynamic encoding may happen multiple times for a superblock 201. If the header 300 leaks to memory 6 it is possible for the DPU 4 to read a header 300 which has a reference to a body buffer layout which may be overwritten by a later dynamic encode. This race can potentially produce a corrupt input to the DPU 4.

The Applicant has furthermore recognised that, for fragment shading (i.e., a fragment pipeline with a tile buffer 35), this problem will only arise for tiles for which the GPU 2 does not produce an entire tile of data for the current frame, such as e.g., boundary tiles.

Figure 6:
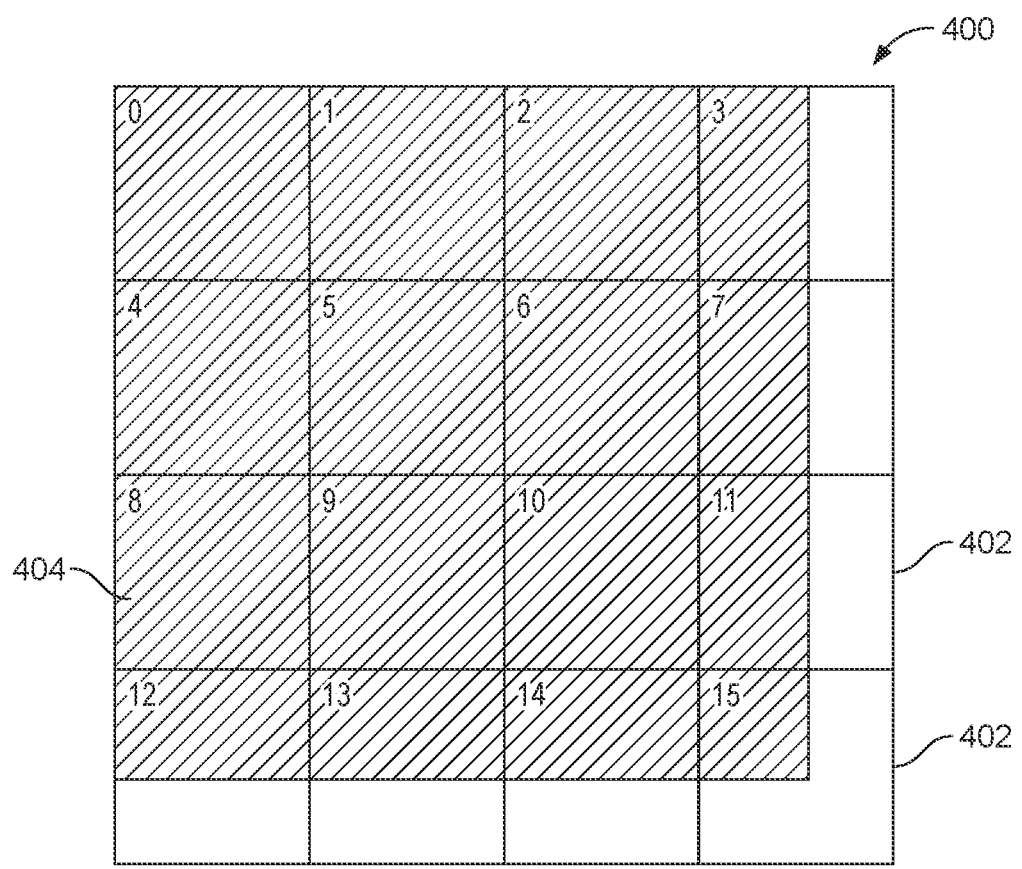
FIG. 6 shows schematically a render output that may be processed in accordance with embodiments of the technology described herein.

This is illustrated by FIG. 6. FIG. 6 shows a frame 400 which is divided into a plurality of tiles 402 (in this case 16 tiles, i.e., tiles 0-15). The shaded region 404 illustrates the extent of a render output generated by the GPU 2. As shown in FIG. 6, in this example, the render output 404 does not cover the entire frame 400. The render output 404 covers some of the tiles 402 completely (namely tiles 0-2, 4-6 and 8-10), but only partially covers others of the tiles 402 (namely tiles 3, 7, 11 and 12-15).

Thus, in this example, the above-described problem will only arise for the partially covered tiles, namely tiles 3, 7, 11 and 12-15.

The Applicant has also recognised that this problem can occur more often for compute shaders, where the render output data is commonly smaller than a tile.

Thus, the problem of a secondary body buffer 304 being written to more than once will only arise for partially covered tiles. In the present embodiment, in order to avoid this problem, partially covered tiles are treated as a special case, while covered tiles are treated as normal.

In particular, in the present embodiment, for partially covered tiles, the header 300 is written such that it is invariant across multiple encode operations. In other words, the header 300 is written in a form that allows the secondary body buffer 304 to be written to more than once without having to update the header 300, i.e., such that the body data description within the header 300 can be used to properly decode both the old and the new body data.

The Applicant has furthermore recognised that, in the case of AFBC encoding, a suitable invariant encoding is the fully uncompressed mode.

Thus, in the present embodiment, partially covered tiles are encoded as fully uncompressed. This means that, even if the secondary body data is updated more than once, the earlier header 300 will be valid, so that the display controller 4 will always be able to read valid data.

For front buffer rendering using a fragment workload, this arrangement means that only boundary superblocks (e.g., tiles 3, 7, 11 and 12-15 in FIG. 6) are uncompressed, while the bulk of the tiles (e.g., tiles 0-2, 4-6 and 8-10 in FIG. 6), are compressed, leading to a good overall compression. For front buffer rendering using compute shaders, the output buffer would be fully uncompressed (which is a valid AFBC encoding).

In the present embodiment, when writing back a partially covered tile from the tile buffer 35 to the memory 6, the header 300 of the previous version of the tile (stored in memory 6) is firstly checked. If the header 300 indicates that compressed data is currently present in the memory 6, it can be assumed that this is the first time that the new body buffer 304 is being written to. In this case, the normal process of writing to the new secondary body buffer 304, and then updating header 300, may be used. However, the data is written in an uncompressed form.

If the header 300 is indicative of uncompressed data, it can be assumed that this is a secondary update to a secondary body buffer 304 that has already been written to. So, in this case the data is written in an uncompressed form to the secondary body buffer 304 without updating the header 300.

Thus, the present embodiment provides two body buffers 302, 304 and a single header buffer 300. Body buffer selection is handled using the following header inspection heuristic: (1) if the header 300 is in compressed mode, (i) encode the block as uncompressed, and (ii) swap the primary/secondary body buffers; (2) if the header is in uncompressed mode: (i) encode the block as uncompressed, and (ii) do not swap the primary/secondary buffers.

Figure 7:
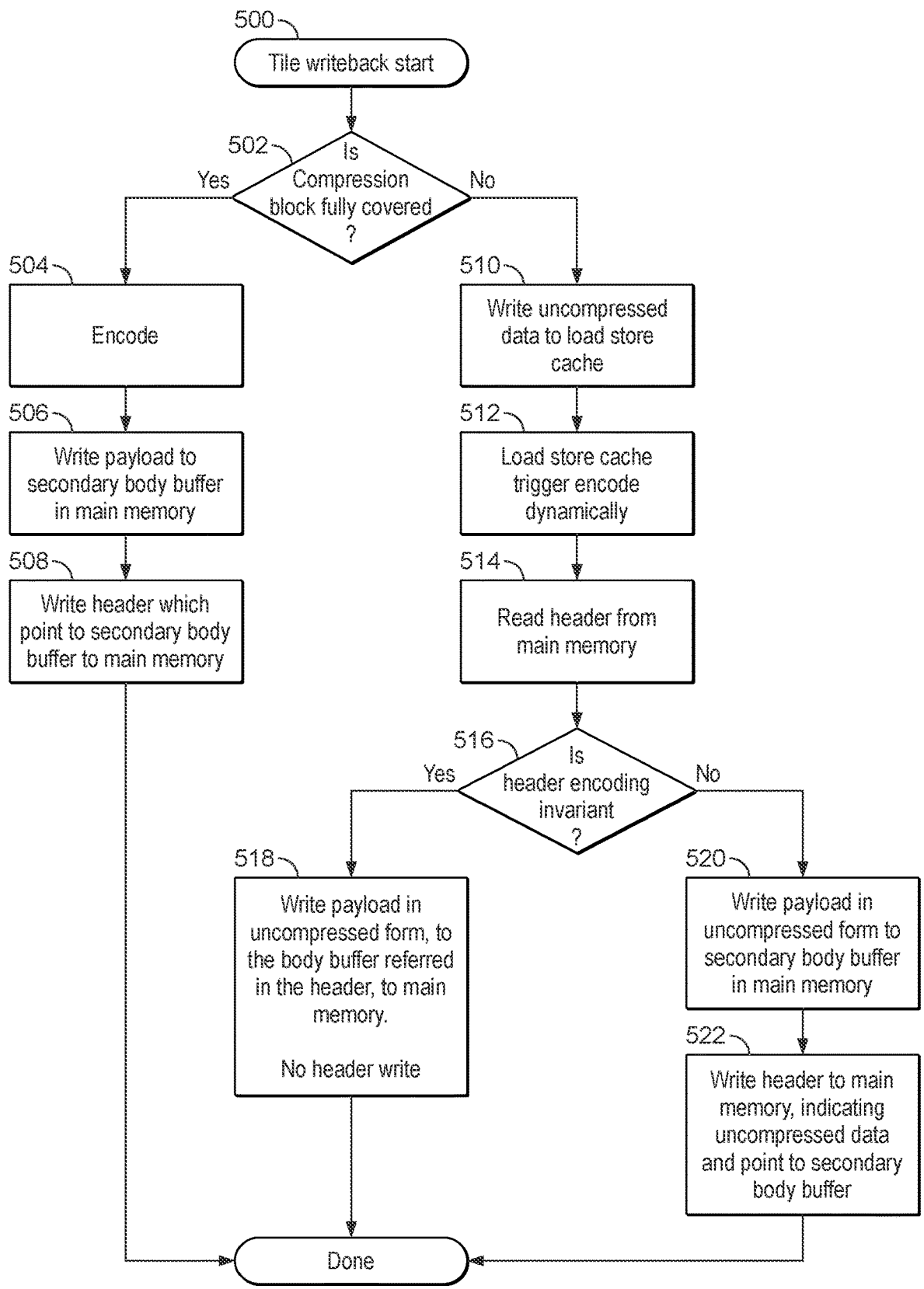
FIG. 7 shows schematically a method of operating a graphics processing system in accordance with embodiments of the technology described herein.

FIG. 7 illustrates this process. As show in FIG. 7, when the GPU 2 begins a tile writeback process (step 500), a determination is made as to whether or not the compression block 201 (e.g., the current tile) is fully covered (step 502).

If the current tile is fully covered, then the tile is encoded and written to the memory 6 in the normal manner described above with respect to FIG. 5. Thus, the tile is encoded (step 504), its payload data is written to the secondary body buffer 304 in main memory 6 (step 506), and then the header 300 is updated so as to point to the secondary body buffer 304 (step 508).

If, however, the current tile is not fully covered, then its data is initially written in an uncompressed form to the load/store cache 25 (step 510).

Then, if one or more cache lines are evicted from the load/store cache 25 so as to trigger an encode operation (step 512), the header 300 for the previous version of the block in question (in memory 6) is read (step 514), and a determination is made as to whether the header 300 is in an invariant form (step 516).

If the header 300 is in an invariant form (e.g., indicative of uncompressed data), then the payload data is written in uncompressed form to the body buffer referred to by the header 300 (step 518). The header 300 is not updated.

If the header 300 it not in an invariant form, the payload data is written in uncompressed form to the secondary body buffer 304 in main memory 6 (step 520), and then a new header 300 is written to main memory 6 indicative of the uncompressed data and pointing to the secondary body buffer 304 (step 522).

Thus, when writing to a defined buffer which is already in compressed mode and pointing to the primary body buffer 302, a new valid uncompressed block will be written to the secondary body buffer 304, and the header 300 updated to swap the body buffers.

When writing to a defined buffer which is already in uncompressed mode and pointing to the primary body buffer 302, a new valid uncompressed block will be written to the primary body buffer 302, and the header will not be updated and the body buffers will not be swapped.

When writing to an undefined buffer, i.e., one which has not been written to before: (a) if the buffer looks like it has an invalid header, a valid uncompressed block is encoded to the primary body buffer 302, and a valid header 300 is written; (b) if the buffer happens to look like it is in compressed mode, a valid uncompressed block is encoded, and the buffers are swapped by updating the header 300; (c) if the buffer happens to look like it is in uncompressed mode, a valid uncompressed block is encoded, and the buffers are not swapped and the header 300 is not updated.

In all cases, the block is encoded in a valid (e.g., AFBC) manner.

This scheme leads to a number of possible scenarios, as illustrated in FIG. 8.

Figure 8A:
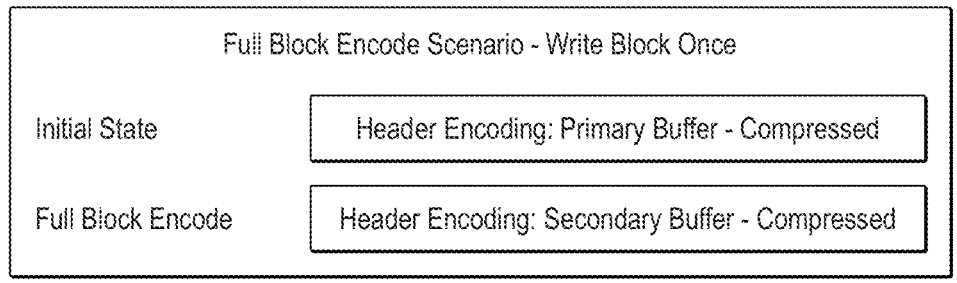
FIGS. 8A-C show schematically encoding scenarios in accordance with embodiments of the technology described herein.

As show in FIG. 8A, in a first scenario, a block 201 is currently encoded in a compressed mode. When a new full block is to be stored in the memory 6, the new block is encoded and written to the secondary buffer 304 (in the manner described above with respect to FIG. 5).

Figure 8B:
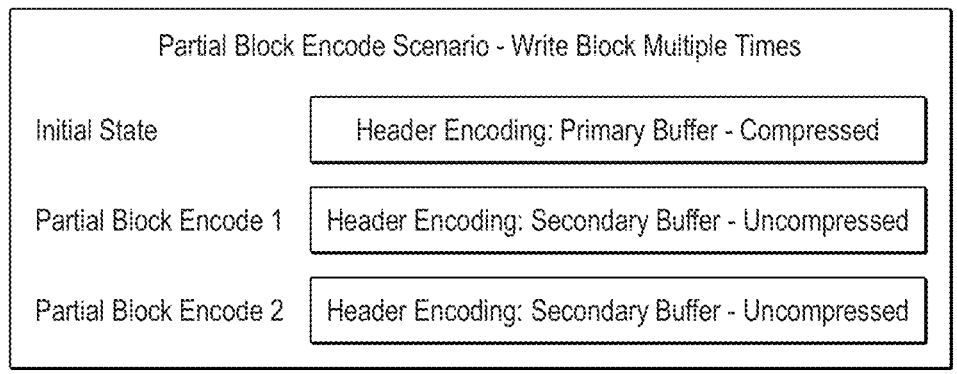

As shown in FIG. 8B, in another scenario, a block 201 is currently encoded in a compressed mode. When a new partial block is to be stored in the memory 6, the new block is written to the secondary buffer 304 in an uncompressed mode. Then, when another partial block is to be stored in the same secondary buffer 304, it is also written to the secondary buffer 304 in the uncompressed mode.

Figure 8C:
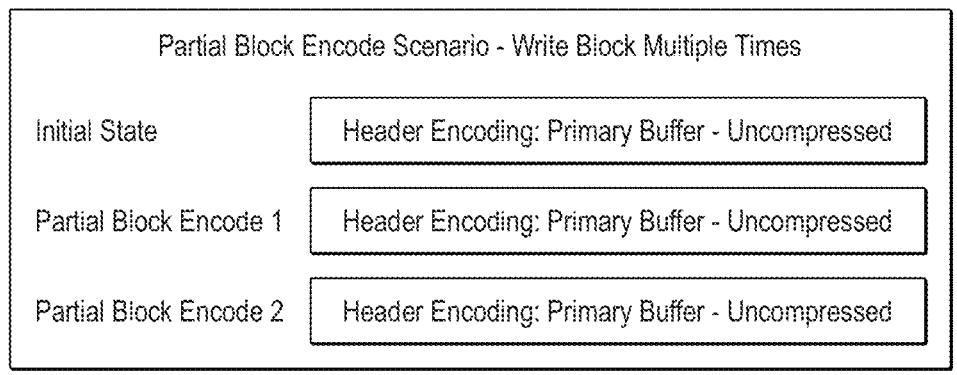

As shown in FIG. 8C, in another scenario, a block 201 is currently stored in an uncompressed mode. When a new partial block is to be stored in the memory 6, the new block is written to the secondary buffer 304 in an uncompressed mode. Then, when another partial block is to be stored in the same secondary buffer 304, it is also written to the secondary buffer 304 in the uncompressed mode.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical applications, to thereby enable others skilled in the art to best utilise the technology, in various embodiments and with various modifications as are suited to the particular use contemplated. It is intended that the scope be defined by the claims appended hereto.

What is claimed is:

1. A method of operating a data processing system that comprises a processor operable to generate arrays of data, wherein the processor comprises one or more local buffers configured to store data generated by the processor locally to the processor prior to that data being written out from the processor to memory;

the method comprising:

the processor generating data elements of an array of data and storing the data elements in the one or more local buffers; and when a set of data elements of the array of data is to be written from the one or more local buffers to memory:

determining whether the set of data elements corresponds to less than an entire region of plural separate regions that the array of data is divided into; and when it is determined that the set of data elements corresponds to less than an entire region of the plural separate regions that the array of data is divided into:

encoding the set of data elements so as to produce an encoded block of data and storing the encoded block of data in memory by: writing body data to one of a first body buffer and a second body buffer in memory, wherein the set of data elements is encoded using a first encoding for which header information descriptive of the body data will be independent of the values of the data elements being encoded.

2. The method of claim 1, wherein the first encoding comprises an encoding for which a data layout used to store the body data is independent of the values of the data elements being encoded.

3. The method of claim 1, wherein the first encoding comprises an encoding for which the body data is uncompressed.

4. The method of claim 1, comprising when it is determined that the set of data elements corresponds to less than an entire region:

determining whether the set of data elements should be combined with existing data in memory for the region.

5. The method of claim 4, comprising:
determining that the set of data elements should be combined with existing data for the region when existing header information in memory for the region is indicative of the first encoding; and/or
determining that the set of data elements need not be combined with existing data for the region when existing header information in memory for the region is indicative of an encoding other than the first encoding.

6. The method of claim 4, wherein the method comprises:
when it is determined that the set of data elements need not be combined with existing data for the region:
encoding the set of data elements using the first encoding so as to produce the encoded block of data and storing the encoded block of data in memory by: writing body data to the one of the first body buffer and the second body buffer to which an existing pointer in memory for the region is other than pointing, and then writing a header to memory, wherein the header comprises (i) a pointer that points to the one of the first body buffer and the second body buffer to which the body data was written, and (ii) the header information descriptive of the body data.

7. The method of claim 4, wherein the method comprises:
when it is determined that the set of data elements should be combined with existing data for the region:
obtaining the existing data for the region from one of the first body buffer and the second body buffer;
combining the set of data elements with the existing data so as to produce a modified block of data; and
encoding the modified block of data using the first encoding so as to produce the encoded block of data and storing the encoded block of data in memory by: writing body data to the one of the first body buffer and the second buffer from which the existing data was obtained.

8. The method of claim 4, comprising when it is determined that the set of data elements should be combined with existing data for the region storing the encoded block of data in memory without writing a header to memory.

9. The method of claim 1, further comprising reading data from memory for a region of the plural separate regions that the array of data is divided into by:
reading a header for the region from memory, wherein the header includes a pointer that points to one of a first body buffer and a second body buffer; and
obtaining body data for the region from the one of the first body buffer and the second body buffer to which the pointer points.

10. The method of claim 9, wherein the header includes header information descriptive of the body data, and wherein the method further comprises decoding the body data using the header information.

11. A data processing system that comprises:
a processor comprising one or more local buffers configured to store data locally to the processor, wherein the processor is configured to generate data elements of an array of data and to store the data elements in the one or more local buffers; and
a processing circuit configured to:
when a set of data elements of an array of data generated by the processor is to be written from the one or more local buffers to memory:
determine whether the set of data elements corresponds to less than an entire region of plural separate regions that the array of data is divided into; and
when it is determined that the set of data elements corresponds to less than an entire region of the plural separate regions that the array of data is divided into:
encode the set of data elements so as to produce an encoded block of data and store the encoded block of data in memory by: writing body data to one of a first body buffer and a second body buffer in memory, wherein the set of data elements is encoded using a first encoding for which header information descriptive of the body data will be independent of the values of the data elements being encoded.

12. The data processing system of claim 11, wherein the first encoding comprises an encoding for which a data layout used to store the body data is independent of the values of the data elements being encoded.

13. The data processing system of claim 11, wherein the first encoding comprises an encoding for which the body data is uncompressed.

14. The data processing system of claim 11, wherein the processing circuit is configured to, when it is determined that the set of data elements corresponds to less than an entire region:
determine whether the set of data elements should be combined with existing data in memory for the region.

15. The data processing system of claim 14, wherein the processing circuit is configured to:
determine that the set of data elements should be combined with existing data for the region when existing header information in memory for the region is indicative of the first encoding; and/or
determine that the set of data elements need not be combined with existing data for the region when existing header information in memory for the region is indicative of an encoding other than the first encoding.

16. The data processing system of claim 14, wherein the processing circuit is configured to, when it is determined that the set of data elements need not be combined with existing data for the region:
encode the set of data elements using the first encoding so as to produce the encoded block of data and store the encoded block of data in memory by: writing body data to the one of the first body buffer and the second body buffer to which an existing pointer in memory for the region is other than pointing, and then writing a header to memory, wherein the header comprises (i) a pointer that points to the one of the first body buffer and the second body buffer to which the body data was written, and (ii) the header information descriptive of the body data.

17. The data processing system of claim 14, wherein the processing circuit is configured to, when it is determined that the set of data elements should be combined with existing data for the region:
obtain the existing data for the region from one of the first body buffer and the second body buffer;
combine the set of data elements with the existing data so as to produce a modified block of data; and
encode the modified block of data using the first encoding so as to produce the encoded block of data and store the encoded block of data in memory by: writing body data to the one of the first body buffer and the second buffer from which the existing data was obtained.

18. The data processing system of claim 14, wherein the processing circuit is configured to, when it is determined that the set of data elements should be combined with existing data for the region, store the encoded block of data in memory without writing a header to memory.

19. The data processing system of claim 11, further comprising a second processor;
   wherein the second processor is configured to read data from memory for a region of the plural separate regions that the array of data is divided into by:
      reading a header for the region from memory, wherein the header includes a pointer that points to one of a first body buffer and a second body buffer, and header information descriptive of the body data; and
      obtaining body data for the region from the one of the first body buffer and the second body buffer to which the pointer points; and
   wherein the second processor is configured to decode the body data using the header information.

20. A non-transitory computer readable storage medium storing computer software code which when executing on a processor performs a method of
   operating a data processing system that comprises a processor operable to generate arrays of data, wherein the processor comprises one or more local buffers configured to store data generated by the processor locally to the processor prior to that data being written out from the processor to memory;
   the method comprising:
   the processor generating data elements of an array of data and storing the data elements in the one or more local buffers; and
   when a set of data elements of the array of data is to be written from the one or more local buffers to memory:
   determining whether the set of data elements corresponds to less than an entire region of plural separate regions that the array of data is divided into; and
   when it is determined that the set of data elements corresponds to less than an entire region of the plural separate regions that the array of data is divided into:
   encoding the set of data elements so as to produce an encoded block of data and storing the encoded block of data in memory by: writing body data to one of a first body buffer and a second body buffer in memory, wherein the set of data elements is encoded using a first encoding for which header information descriptive of the body data will be independent of the values of the data elements being encoded.

* * * * *